United States Patent [19]

Nicco et al.

[11] Patent Number: 4,657,781

[45] Date of Patent: Apr. 14, 1987

[54] PROCESS FOR CROSSLINKING ETHYLENE POLYMERS CONTAINING ANHYDRIDE FUNCTIONS, CROSSLINKABLE POLYMERS COMPOSITIONS AND THE APPLICATION OF THESE COMPOSITIONS TO THE COATING OF SUBSTRATES

[75] Inventors: Adrien Nicco, Bethune; Jerome Hubert, Paris; Jacques Druz, Strasbourg; Morand Lambla, Bischheim, all of France

[73] Assignee: Societe Chimique des Charbonnages S.A., France

[21] Appl. No.: 884,204

[22] Filed: Jul. 10, 1986

Related U.S. Application Data

[62] Division of Ser. No. 666,228, Oct. 29, 1984, Pat. No. 4,612,349.

[30] Foreign Application Priority Data

Oct. 28, 1983 [FR] France ............................ 83 17273

[51] Int. Cl.$^4$ ............................................. B05D 5/12
[52] U.S. Cl. .................................... 427/117; 427/120; 525/117; 525/119
[58] Field of Search ................. 427/117, 120; 525/117

[56] References Cited

U.S. PATENT DOCUMENTS

| | | | |
|---|---|---|---|
| 2,977,334 | 3/1961 | Zopf, Jr. et al. | 525/117 |
| 3,278,495 | 11/1966 | Hagel et al. | 526/272 |
| 3,321,424 | 5/1967 | Imes et al. | 525/117 |
| 3,514,419 | 5/1970 | Darlow et al. | 525/117 |
| 3,637,579 | 1/1972 | Barie, Jr. et al. | 260/41 A |
| 3,760,031 | 9/1973 | Sato et al. | 260/836 |

FOREIGN PATENT DOCUMENTS 1145841 3/1969 United Kingdom .

Primary Examiner—Joseph L. Schofer
Assistant Examiner—Bernard Lipman
Attorney, Agent, or Firm—Finnegan, Henderson, Farabow, Garrett & Dunner

[57] ABSTRACT

A crosslinking process wherein at a temperature of about 10° to 160° C., under a pressure of about 1 to 300 bars and for at least about 0.5 hour, a polymer, containing from about 42 to 99% by weight of units derived from ethylene and, where appropriate, also from an α-olefin, from about 1 to 8% by weight of units derived from maleic anhydride and from 0 to about 50% by weight of units derived from at least one additional monomer selected from an ester of an unsaturated carboxylic acid with an alcohol containing from 1 to 12 carbon atoms, is reacted with at least one polyepoxide compound, preferably present in an amount of from about 1 to 10 parts by weight, based on 100 parts by weight of the polymer, in the presence of at least one catalyst suitable for reacting the anhydride functions with the epoxide functions. The catalyst is preferably present in an amount from about 0.02 to 2 parts by weight, based on 100 parts by weight of the polymer. The crosslinkable compositions may be used to coat a substrate such as an electric cable.

3 Claims, No Drawings

PROCESS FOR CROSSLINKING ETHYLENE POLYMERS CONTAINING ANHYDRIDE FUNCTIONS, CROSSLINKABLE POLYMERS COMPOSITIONS AND THE APPLICATION OF THESE COMPOSITIONS TO THE COATING OF SUBSTRATES

This is a division of application Ser. No. 666,228, filed Oct. 29, 1984, now U.S. Pat. No. 4,612,349.

BACKGROUND OF THE INVENTION

The present invention relates to a process for crosslinking ethylene polymers containing anhydride functions, crosslinkable polymer compositions and the application of these compositions to the coating of substrates.

Various processes are known and employed industrially for crosslinking polyethylene under effective conditions, but they have disadvantages which restrict their use. The process of incorporating sources of free radicals (peroxide) is difficult to carry out because:

(1) an excess of reactant (1 to 3% by weight) is employed to compensate for the fairly low yield of bridge formation and losses of reactant caused by the antioxidants or anti-aging additives;

(2) the addition of the peroxidic reactant requires that temperature be rigorously controlled to avoid a premature reaction involving decomposition of the reactant and partial crosslinking of the polyethylene, because the initial reaction has a high activation energy (30,000 to 40,000 calories per mole) and a rise in temperature of 10° C. is sufficient to cause a major acceleration of the reaction;

(3) the reaction is slowed down considerably between 10° and 100° C. because of the high activation energy involved, and it is impossible to obtain the reaction after shaping or forming and cooling. The reaction must therefore be accelerated by working at a high temperature, such as 190° to 220° C., to carry out the reaction in 30 to 60 seconds, which requires large equipment operating under demanding conditions, e.g., a 100 meter long oven for coating electric cables, heating by steam or gas circulation under a pressure from 10 to 20 bars, continuous delivery under pressure, and the like; and (4) there is a very restricted choice of antioxidants or anti-aging additives that will not inhibit crosslinking so that moderately good aging resistance properties can be obtained.

Another process involves grafting a reactant of the vinyltriethoxysilane type on the polyethylene. In this process, it is possible to crosslink under milder conditions, but the following difficulties arise:

(1) the grafting requires kneading with the silane reactant and a small quantity of peroxide initiator. Kneading makes the reaction sensitive to small amounts of inhibitor and results in a product of uneven quality which may not be sufficiently crosslinkable;

(2) if the quality of the grafted polymer is to be monitored, the latter must be stored after granulation and cooling, which requires very severe storage conditions to prevent the stock from being crosslinked by moisture. If, however, granulation and storage are avoided, there is a risk of producing costly cables which may not be sufficiently crosslinked;

(3) shaping or forming by extrusion must be followed by extended storage in a warm and moist environment to ensure fairly rapid crosslinking (24 h) at low thicknesses (1 to 3 mm); and (4) aging resistance will be good only if the anti-aging additives are injected after grafting but before shaping or forming.

Olefin polymers or copolymers containing structural units derived from maleic anhydride are already known. U.S. Pat. No. 3,637,579, for example, describes an adhesive composition containing a copolymer of a straight-chain mono-α-olefin and maleic anhydride, a liquid polyepoxide and a pulverulent filler. The copolymer described must be considered to be a polyanhydride and not a copolymer with a low concentration of maleic anhydride, because the macromolecular structure contains as many α-olefin structural units as anhydride structural units. The compositions according to this patent cannot be employed in the fabrication of cable coatings.

U.S. Pat. No. 3,760,031 also relates to adhesive compositions, which are intended to promote the adhesion of ethylenevinyl acetate copolymers to a solid material, incorporating (A) a grafted product obtained by reacting an ethylene-vinyl acetate copolymer, or a derivative, with an unsaturated carboxylic acid or its anhydride and (B) a compound containing at least two epoxide groups. The grafted product (A) is thermally unstable and releases corrosive acetic acid between 150° and 250° C., which is undesirable for products which must be stable when exposed to high temperatures.

SUMMARY OF THE INVENTION

To avoid these disadvantages, the process according to the invention employs a composition based on modified polyethylene which also contains reactive maleic anhydride groups.

The present invention is a process for crosslinking a polymer containing structural units derived from ethylene and maleic anhydride comprising the step of reacting a polymer containing from about 42 to 99% by weight of structural units derived from ethylene and from about 1 to 8% by weight of structural units derived from maleic anhydride with at least one polyepoxide compound in the presence of at least one catalyst suitable for reacting the anhydride functions with the polyepoxide functions at a temperature of from about 10° to 160° C., under a pressure of from about 1 to 300 bars and for at least about 0.5 hour.

The invention is also a crosslinkable composition comprising:

(A) a polymer of ethylene and maleic anhydride containing
  (a) from about 42 to 99% by weight of structural units derived from ethylene;
  (b) from about 1 to 8% by weight of structural units derived from maleic anhydride; and
  (c) from 0 to about 50% by weight of structural units derived from at least one additional monomer selected from an ester of an unsaturated carboxylic acid with an alcohol containing from 1 to 12 carbon atoms;

(B) from about 1 to 10 parts by weight, based on 100 parts by weight of the polymer (A), of at least one polyepoxide compound; and (C) from about 0.02 to 2 parts by weight, based on 100 parts by weight of the polymer (A), of at least one catalyst suitable for reacting the anhydride functions with the epoxide functions.

The invention, moreover, is a process for preparing the crosslinkable composition described above comprising the steps of kneading the mixture of polymer, polyepoxide compound and catalyst at a temperature greater than or equal to the melting temperature of the polymer and less than or equal to about 150° C. for a period of between about 1 minute and 15 minutes.

The invention is also a method of coating a substrate comprising the steps of:

(1) applying to said substrate a crosslinkable composition comprising:
(A) a polymer of ethylene and maleic anhydride containing
  (a) from about 42 to 99% by weight of structural units derived from ethylene;
  (b) from about 1 to 8% by weight of structural units derived from maleic anhydride; and
  (c) from 0 to about 50% by weight of structural units derived from at least one additional monomer selected from an ester of an unsaturated carboxylic acid with an alcohol containing from 1 to 12 carbon atoms; and
(B) from about 1 to 10 parts by weight, based on 100 parts by weight of the polymer (A), of at least one polyepoxide compound; and
(C) from about 0.02 to 2 parts by weight, based on 100 parts by weight of the polymer (A), of at least one catalyst suitable for reacting the anhydride functions with the epoxide functions; and (2) reacting the crosslinkable composition at a temperature of from about 10° to 160° C., under a pressure of from about 1 to 300 bars, and for at least about 0.5 hour.

DETAILED DESCRIPTION OF THE PREFERRED EMBODIMENTS

Reference will now be made in detail to the presently preferred embodiments of the invention. In accordance with the invention, a polymer containing from about 42 to 99% by weight of structural units derived from ethylene and, where appropriate also from at least one α-olefin, and from about 1 to 8% by weight of structural units derived from maleic anhydride and from 0 to about 50% by weight of structural units derived from at least one additional monomer selected from an ester of an unsaturated carboxylic acid with an alcohol containing from 1 to 12 carbon atoms, is reacted at a temperature of from about 10° to 160° C., under a pressure of from about 1 to 300 bars and for at least about 0.5 hour with at least one polyepoxide compound in the presence of at least one catalyst suitable for reacting the anhydride functions with the polyepoxide functions.

The polymer subjected to crosslinking may be obtained by grafting maleic anhydride on polyethylene obtained either by a high temperature (about 140°-280° C.), high pressure (about 1000 to 3000 bars) process in the presence of a free radical initiator (such as oxygen, peroxides or peresters), or by processes employing a Ziegler-type catalyst. The grafting may also be carried out with ethylene copolymers containing at least about 60% by weight of structural units derived from ethylene and at least one other monomer selected from the group consisting of propylene and esters of ethylenically unsaturated carboxylic acids with an alcohol containing from 1 to 12 carbon atoms. In particular, when the polymerization is accomplished by use of a free radical initiator, it is preferred to use the alkyl acrylates, methacrylates and maleates in which the alkyl group contains from 1 to 12 carbon atoms. The proportions of propylene structural units incorporated by copolymerization are generally low.

The monomer used in combination with ethylene and maleic anhydride is advantageously an olefin containing at least 3 carbon atoms when the polymer subjected to grafting with maleic anhydride is obtained by means of a Ziegler-type catalyst.

It is thus possible to obtain, by grafting, polymers containing from about 1 to 3%, by weight, of structural units derived from maleic anhydride by kneading, at a temperature from about 140° to 220° C., a mixture of polyethylene or polyethylene copolymer with about 2 to 10% of maleic anhydride and about 0.1 to 1% of peroxide or perester initiator.

The polymer subjected to crosslinking may preferably be obtained by the copolymerization of ethylene and maleic anhydride at a high temperature (about 140°-280° C.) and under high pressure (about 1000 to 3000 bars) in the presence of a free radical initiator. In addition to these two compounds, the mixture subjected to the copolymerization may also contain at least one other monomer selected from the group consisting of propylene and esters of unsaturated carboxylic acids with an alcohol containing from 1 to 12 carbon atoms. Particularly preferred esters are the alkyl acrylates, methacrylates and maleates in which the alkyl group contains from 1 to 12 carbon atoms. When propylene is employed as a comonomer, the number of propylene structural units incorporated in the macromolecular chain is generally small. The polymer obtained in this manner may contain from about 1 to 8% by weight of structural units derived from maleic anhydride.

The polyepoxide compound reacted with the polymer has the formula:

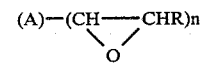

in which A is a polyfunctional group of valency $n \leq 2$ and R is a hydrocarbon radical. Polyglycidyl ethers of polyhydroxy compounds are preferred. Particularly preferred are polyepoxide compounds of an aliphatic type, particularly polyglycidyl ethers of polyalcohols, such as diglycidyl ethers of α,ω-diols, including butanediol diglycidyl ether, hexanediol diglycidyl ether, paracyclohexyldimethanol diglycidyl ether and neopentyl glycol diglycidyl ether, triglycidyl ethers of triols, including trimethylolpropane triglycidyl ether and glycerol triglycidyl ether, and tetraglycidyl ethers of tetrols including pentaerythritol tetraglycidyl ether.

Compounds derived by epoxidation of olefin compounds may also be used. Epoxidised soyabean oil is particularly preferred.

Taking into account the concentration of anhydride functions present in the crosslinkable polymer, the quantity of polyepoxide compound to be employed to produce the crosslinking is advantageously selected to be between about 1 and 10 parts by weight per 100 parts by weight of polymer. Advantageously it is such that the molar ratio $$\frac{\text{epoxide functions in the polyepoxide compound}}{\text{anhydride functions in the polymer}}$$

is between about 0.5 and 1.1.

Crosslinking of the polymer takes place by a reaction, in the presence of a suitable catalyst, between the anhydride functions in the polymer and the epoxide functions in the polyepoxide compound. The catalyst is preferably a tertiary amine. Representative tertiary amines include dimethyllaurylamine, N-butylmorpholine, N,N-dimethylcyclohexylamine, benzyldimethylamine, pyridine, 4-dimethylaminopyridine, 1-methylimidazole, tetramethylethylenediamine, tetramethylguanidine, triethylenediamine, tetramethylhydrazine, N,N-dimethylpiperazine and N,N,N',N'-tetramethyl-1,6-hexanediamine.

The quantity of tertiary amine catalyst employed is advantageously between about 0.02 and 2 parts by weight per 100 parts by weight of polymer.

The crosslinking (formation of bridges between the macromolecular chains of the polymer by means of the polyepoxide compounds) takes place, preferably in the absence of moisture, at a temperature of between about 10° and 160° C. and over a period which is an inverse function of temperature and is greater than or equal to about 0.5 hour. The crosslinking may also be carried out at different, for example progressive, temperatures, over periods which may be different, as may be readily determined by one of ordinary skill in the art without undue experimentation.

In accordance with the present invention, a crosslinkable polymer composition which may be employed in the crosslinking process described above comprises (A) a polymer of ethylene and maleic anhydride containing (a) from about 42 to 99% by weight of structural units derived from ethylene and, where appropriate, an α-olefin monomer, (b) from about 1 to 8% by weight of structural units derived from maleic anhydride, and (c) from 0 to about 50% by weight of structural units derived from at least one additional monomer selected from an ester of an unsaturated carboxylic acid with an alcohol containing from 1 to 12 carbon atoms.

The composition also comprises (B) from about 1 to 10 parts by weight, based on 100 parts by weight of polymer (A), of at least one polyepoxide compound and (C) from about 0.02 to 2 parts by weight, based on 100 parts by weight of polymer (A, of at least one catalyst suitable for reacting the anhydride functions with the epoxide functions.

A polymer of ethylene and maleic anhydride is understood to mean both the products obtained by grafting maleic anhydride on polyethylene and, if appropriate, on copolymers of ethylene and at least one other comonomer, as well as the copolymers obtained, preferably directly, by the copolymerization of maleic anhydride with ethylene, and if appropriate, with at least one other comonomer. The details of these two methods of preparation have been set forth above and can be carried out by one of ordinary skill in the art without undue experimentation.

The polyepoxide compounds and the suitable catalyst are advantageously chosen from the compounds mentioned above.

In accordance with the invention, the crosslinkable polymer compositions are advantageously prepared by a process comprising the step of kneading the mixture of polymer, polyepoxide compound and catalyst at a temperature above or equal to the melting temperature of the polymer and below or equal to about 150° C. for a period of between about 1 minute and 15 minutes. The kneaded mixture is formed or shaped, if appropriate under pressure, into the form of sheets, films, rods or granulates. The shape obtained is cooled.

Obviously, the kneading time becomes shorter as the temperature becomes greater. The compositions remain thermoplastic during shaping or forming by any known process applied to thermoplastic materials. After shaping or forming, the product is subjected to a polymer bridging reaction by being held between about 10° and 160° C., preferably in the absence of moisture, for a period of at least about 0.5 hour.

Preferably, the crosslinkable polymer compositions are obtained by preparing masterbatches containing, respectively and separately:

(A) the polymer described above and the tertiary amine catalyst, the concentration of catalyst in this masterbatch being higher than that required in the crosslinkable polymer composition; and (B) the polymer described above and the polyepoxide compound, the concentration of polyepoxide compound in this masterbatch being higher than that required in the crosslinkable polymer composition.

These masterbatches are dry-mixed in the presence or absence of adjuvant-free polymer. The quantity of adjuvant-free polymer, which is to be added if appropriate, is a function of the concentration in each masterbatch of the catalyst and polyepoxide compound respectively. Similarly, the proportion of masterbatch A relative to masterbatch B is a function of these concentrations, as will be readily apparent to one of ordinary skill in the art.

In this preferred method, each of the masterbatches and, if appropriate, the adjuvant-free polymer are in the form of powder or granules and thus the crosslinkable polymer composition may be obtained simply by dry-mixing. Each masterbatch can be stored even for prolonged periods without undergoing change. After dry-mixing, the crosslinkable polymer compositions in the form of powder or granules are processed in a converting machine and formed or shaped as described above.

The crosslinking reaction occurring in accordance with the invention can become increasingly extensive over time and can produce a beneficial improvement in the polymer of ethylene and maleic anhydride, especially with regard to mechanical properties (tensile strength at break, creep resistance, cracking resistance, and the like), not only at temperatures below that of the melting point of the polymer but also at temperatures of 100° to 200° C. at which unmodified polyethylene loses all its strength.

In addition, it is possible to incorporate in the composition a wide variety of antioxidants, light stabilizers, pigments, and other additives, as in polyethylene, without greatly disturbing the crosslinking reaction or lowering the properties obtained. It is also possible to use the crosslinked polyethylene or the crosslinked copolymers in accordance with the present invention under temperature and stress conditions in which the non-crosslinked polymers cannot be employed.

The compositions according to the invention can be used for all the purposes for which crosslinked polyethylene is already employed. In particular, compositions in accordance with the invention can be used for coating a substrate, such as electric cables, the insulating material of which must retain satisfactory properties during momentary heating, after prolonged use while hot, during weather aging, and during periods of immersion in water.

It may be intended that a substrate be fixed to another substrate by gluing. In this case it is preferable to use crosslinkable compositions in accordance with the invention which are obtained from polymers having a melt index of between 5 and 500 dg/min. The polyepoxide reactant is incorporated into the crosslinkable composition a few seconds to a few minutes before the application. On being cooled, the crosslinkable composition has properties which are similar to a melt adhesive. The composition gradually crosslinks, which improves its mechanical properties.

Other applications for crosslinkable compositions in accordance with the invention are intended, such as hot water piping for heating, corrosion-resistant and crack-resistant tubing for aqueous solutions and various products, and extruded profiles made of copolymers containing 5 to 20% by weight of structural units derived from at least one acrylate ester, the suppleness and form of which do not permit continuous crosslinking under usual conditions without appreciable distortion. According to the process of the invention, however, the extruded profile may be rapidly cooled and then crosslinked by being kept at a moderate temperature.

For the purpose of enabling the advantages of the invention to be better understood, the following examples are given by way of illustration and are not limitative. In the examples, the abbreviations employed have the following meanings:

MI: melt index expressed in dg/min and determined according to the standard ASTM-D 1238/73,
$\rho$: density expressed in g/cm$^3$ and determined according to French Standard NF T 51-063.

The following mechanical properties are determined according to the standard ASTM D 638-80:
EL: elastic limit expressed in bars,
EB: elongation at break expressed in %,
TSB: tensile strength at break expressed in bars.

Also determined are:
$\phi$: mean rate of creep over 10 minutes, expressed in % min$^{-1}$, and
Et: relative total elongation, expressed in %, by means of subjecting dumbbell-shaped specimens whose narrow part is 30 mm in length, 4 mm in width and 0.4 mm thick to a creep test at 150° C. The specimens are fixed between two jaws and their initial length $L_o$ is measured at 150° C., the stress applied to the specimens being low (balanced jaws). A tensile stress of 4 bars is then applied and the length $L_1$ of the specimens after 1 minute and the length $L_{10}$ after 10 minutes are measured. Then $$Et = \frac{L_{10} - L_o}{L_o}$$

The value $$\phi = \frac{L_{10} - L_1}{10 L_o}$$

is calculated.

EXAMPLES 1 TO 6

Preparation of crosslinkable compositions

Use was made of a terpolymer containing 89.1% by weight of ethylene structural units, 3.3% by weight of maleic anhydride structural units and 7.6% by weight of ethyl acrylate structural units, having the following characteristics:
MI: 6.4 dg/min,
$\rho$: 0.940 g/cm$^3$,
Melting temperature: 100° C.
This terpolymer was kneaded at 130° C. for 8 minutes with, as the polyepoxide compound, neopentylglycol diglycidyl ether (NGDGE) and, as catalyst, hexamethylethylenediamine (HMED) of formula $(CH_3)_2N-C(CH_3)_2-CH_2-N(CH_3)_2$, in quantities (in parts by weight based on 100 parts by weight of terpolymer) as shown below in Table I.

The composition kneaded in this way is molded into specimens 0.4 mm thick. The specimens are then subjected to crosslinking at a temperature T (expressed in °C.) for a time t (expressed in days). The following properties were measured for the crosslinked specimens (except for comparative Examples 1 and 2): $\phi$ and insoluble content (IC), which was measured by extraction with xylene at 142° C. for 48 hours.

EXAMPLES 7 AND 8

Starting with the raw materials described in Examples 1 to 6, preparation of crosslinkable compositions by kneading was carried out in a HAAKE-RHEOCORD plastograph, followed by crosslinking for 10 minutes at a temperature of 160° C.

Table II below shows the quantities of catalyst (HMED) and of polyepoxide compound (NGDGE) employed as parts per 100 parts of copolymer, together with the molar ratio $$\frac{\text{epoxide functions}}{\text{anhydride functions}} = R(e)$$

EXAMPLES 9 TO 16

A terpolymer containing 90.3% by weight of ethylene structural units, 2.6% by weight of maleic anhydride structural units and 7% by weight of ethyl acrylate structural units was employed.

This terpolymer was kneaded under the conditions of Examples 1 to 6 with the catalyst and polyepoxide compound, and then crosslinked at a temperature of 55° C. Table III below shows:
the nature and the quantity (parts per 100 parts of terpolymer) of the catalyst employed,
the nature and the quantity (parts per 100 parts of terpolymer) of the polyepoxide compound employed,
the crosslinking time t (days),
the rate of creep $\phi$,
total elongation Et.

EXAMPLES 17 AND 18

A terpolymer containing 48% by weight of structural units derived from ethylene, 2.8% by weight of structural units derived from maleic anhydride and 49% by weight of structural units derived from ethyl acrylate was employed. This terpolymer is very soft and sticky; it has an MI of 12 dg/min.

100 parts by weight of this terpolymer were kneaded at 80° C. for 6 min with 2.6 parts by weight of NGDGE and 0.8 part by weight of HMED. Table IV below shows the temperature T(°C.) and the time of crosslinking (in hours) together with the rate of creep $\phi$ and the total elongation Et at 150° C., determined as described above.

EXAMPLES 19 TO 22

Ethylene, ethyl acrylate and maleic anhydride were terpolymerized continuously in an autoclave reactor, under a pressure of 1,900 bars and at a temperature of 200° C., to produce a terpolymer having an MI of 6.7 dg/min, containing 92% by weight of structural units derived from ethylene, 3% by weight of structural units derived from maleic anhydride and 5% by weight of structural units derived from ethyl acrylate.

By kneading at 130° C. for 3 min and then by cold granulation, the following two masterbatches A and B were prepared from this terpolymer. Masterbatch A contained 98.4 parts by weight of terpolymer and 1.6 parts by weight of N,N,N',N'-tetramethyl-1,6-hexanediamine. Masterbatch B contained 93.4 parts by weight of terpolymer and 6.6 parts by weight of NGDGE.

By dry mixing 12.5 parts by weight of masterbatch A, 50 parts by weight of masterbatch B and 37.5 parts by weight of terpolymer, a crosslinkable composition was produced which was extruded continuously with a SCHWABENTHAN extruder of diameter D=30 mm and 25 D in length at a screw speed of 40 r.p.m. This extruder was equipped with an annular die of outer diameter 4.3 mm and inner diameter 2.6 mm. The melt temperature at the exit of the die was maintained at 120° C.

The tubes obtained in this way were stored in air at various temperatures.

The mechanical properties of tensile strength at break and elongation at break were measured for these tubes, after the periods of storage shown below in Table V.

In addition, the relative total elongation Ert, expressed in %, obtained after 15 minutes with tubes subjected to a tensile stress of 2 bars at 200° C., was measured.

EXAMPLE 23

A terpolymer and masterbatch A were prepared under the same conditions as in Examples 19 to 22.

By dry mixing 12.5 parts by weight of masterbatch A, 20 parts by weight of LOPOX 810 ® (commercial bisphenol A diglycidyl ether, with an epoxy equivalent of 810 and a DURRAN softening point of 88° C.) and 67.5 parts by weight of terpolymer, a crosslinkable composition was obtained which was extruded under the same conditions as in Examples 19 to 22.

The mechanical properties and total relative elongation were measured under the same conditions and are shown below in Table V.

EXAMPLE 24

Ethylene and maleic anhydride were copolymerized continuously in an autoclave reactor, under a pressure of 2000 bars and at a temperature of 210° C. to produce a copolymer with an MI of 23 dg/min, containing 94.3% by weight of structural units derived from ethylene and 5.7% by weight of structural units derived from maleic anhydride.

A crosslinkable composition containing 93.8 parts by weight of copolymer, 6 parts by weight of NGDGE and 0.2 parts by weight of N,N.N',N'-tetramethyl-1,6-hexanediamine was prepared by mixing on rolls at 110° C. for 3 minutes.

This composition was then molded at 110° C. to obtain a specimen capable of being introduced into the chamber of the MIE optimeter (molding time: 3 min). The progress of the crosslinking was then followed by continuous recording of the torque couple. The optimeter chamber was controlled at 140° C.

The values of the crosslinking couple obtained after various times at 140° C., together with the insolubles content measured for the specimen after 3 hours at 140° C., are shown below in Table VI.

EXAMPLE 25 (comparative)

Table VI also shows the results obtained with a composition which does not contain a tertiary amine catalyst (94 parts by weight of copolymer and 6 parts by weight of NGDGE).

It will be apparent to those skilled in the art that various modifications and variations could be made in the process and composition of the invention without departing from the scope or spirit of the invention.

TABLE I

| Example | HMED | NGDGE | T °C. | t | φ | Et | EL | TSB | EB | IC |
|---|---|---|---|---|---|---|---|---|---|---|
| 1 | 0 | 0 | 20 | — | >180 | rupture | 43 | 121 | 816 | n.d. |
| 2 | 0 | 3.2 | 20 | — | >180 | rupture | n.d. | n.d. | n.d. | n.d. |
| 3 | 0.1 | 3.2 | 80 | 11 | 2 | 60 | 73 | 151 | 190 | 67.4 |
| 4 | 0.7 | 3.2 | 80 | 11 | 1.5 | 20 | n.d. | n.d. | n.d. | 82.5 |
| 5 | 0.1 | 3.2 | 20 | 240 | 4.5 | 80–120 | 68 | 225 | 430 | 30.4 |
| 6 | 0.4 | 3.2 | 20 | 8 | 15 | n.d. | 70 | 155 | 260 | 22.8 | n.d. = not determined

TABLE II

| Example | HMED | NGDGE | R(e) |
|---|---|---|---|
| 7 | 0.4 | 1.6 | 0.45 |
| 8 | 0.4 | 6.4 | 1.80 |

TABLE III

| Example | Catalyst Nature | Catalyst Quantity | Polyepoxide compound Nature | Polyepoxide compound Quantity | t | φ | Et |
|---|---|---|---|---|---|---|---|
| 9 | HMED | 0.4 | BADGE* | 4.1 | 7 | n.d. (***) | n.d. |
| 10 | HMED | 0.4 | ESO* | 7.4 | 22 | n.d. | n.d. |
| 11 | HMED | 0.4 | HDDGE* | 2.7 | 22 | n.d. | n.d. |
| 12 | HMED | 0.4 | TGIC* | 2.3 | 22 | n.d. | n.d. |
| 13 | PDAP** | 0.2 | NGDGE | 2.6 | 22 | 4 | 50 |
| 14 | TMG** | 0.2 | NGDGE | 2.6 | 22 | 2.5 | 40 |
| 15 | MIA** | 0.2 | NGDGE | 2.6 | 22 | 2 | 45 |
| 16 | BDMA** | 0.8 | NGDGE | 2.6 | 22 | 2.5 | 55 |

*BADGE: bisphenol A diglycidyl ether
ESO: epoxidized soyabean oil
HDDGE: 1,6-hexanediol diglycidyl ether
TGIC: triglycidyl isocyanurate
**PDAP: para(dimethylamino)pyridine
TMG: tetramethylguanidine
MIA: 1-methylimidazole
BDMA: benzyldimethylamine
(***) n.d.: not determined

TABLE IV

| Example | T °C. | t | φ | Et |
|---|---|---|---|---|
| 17 | 160 | 0.5 | 6.4 | 102 |
| 18 | 55 | 168 | 1.9 | 19.5 |

TABLE V

| Examples | Storage temperature (°C.) | Storage period (days) | TSB | EB | Ert |
|---|---|---|---|---|---|
| 19 | 23 | 30 | 136 | 280 | 76 |
| 20 | 23 | 57 | n.d.* | n.d. | 26 |

TABLE V-continued

| Examples | Storage temperature (°C.) | Storage period (days) | TSB | EB | Ert |
|---|---|---|---|---|---|
| 21 | 55 | 1 | 153 | 231 | 25 |
| 22 | 80 | 1 | 147 | 168 | 14 |
| 23 | 80 | 11 | 185 | 172 | 27 |

*n.d.: not determined

TABLE VI

| Example | Crosslinking torque (daNm) after 30 min | after 1 hour | after 3 hours | Insolubles content |
|---|---|---|---|---|
| 24 | 0.345 | 0.385 | 0.415 | 73.5% |
| 25 | 0.06 | 0.065 | 0.08 | 2% |

What is claimed is:

1. A method of coating a substrate comprising the steps of:
   (1) applying to said substrate a crosslinkable composition comprising:
      (A) a polymer of ethylene and maleic anhydride containing
         (a) from about 42 to 99% by weight of structural units derived from ethylene;
         (b) from about 1 to 8% by weight of structural units derived from maleic anhydride; and
         (c) from 0 to about 50% by weight of structural units derived from at least one additional monomer selected from an ester of an unsaturated carboxylic acid with an alcohol containing from 1 to 12 carbon atoms; and
      (B) from about 1 to 10 parts by weight, based on 100 parts by weight of the polymer (A), of at least one polyepoxide compound; and
      (C) from about 0.02 to 2 parts by weight, based on 100 parts by weight of the polymer (A), of at least one catalyst suitable for reacting said anhydride functions with said epoxide functions to said substrate; and
   (2) reacting said crosslinkable composition at a temperature of from about 10° to 160° C., under a pressure of from about 1 to 300 bars and for at least about 0.5 hour.

2. The method of claim 1, wherein the substrate is an electric cable.

3. The method of claim 1, wherein in said crosslinkable composition the polymer (A) has a melt index of between 5 and 500 dg/min.

* * * * *